United States Patent

Newkirk

[15] 3,682,142
[45] Aug. 8, 1972

[54] METHOD AND MEANS FOR GENERATING HYDROGEN AND A MOTIVE SOURCE INCORPORATING SAME

[72] Inventor: Marc S. Newkirk, Lynnfield, Mass.

[73] Assignee: International Materials, Lynnfield, Mass.

[22] Filed: May 6, 1971

[21] Appl. No.: 140,858

[52] U.S. Cl..........................123/3, 123/1 A, 123/2, 23/211, 23/281
[51] Int. Cl......F02b 43/08, F02b 63/00, F02b 75/12
[58] Field of Search......123/3, 2, 1 A, 1; 23/211, 281

[56] References Cited

UNITED STATES PATENTS

| | | |
|---|---|---|
| 2,152,196 | 3/1939 | Kokatnur..................123/1 A |
| 3,572,297 | 3/1971 | Murray......................123/1 A |
| 3,608,660 | 9/1971 | Smith et al.................123/1 A |

*Primary Examiner*—Wendell E. Burns
*Attorney*—Cesari & McKenna

[57] ABSTRACT

A hydrogen generation system mixes a liquid hydrocarbon fuel with water and heats the mixture sufficiently to thermally decompose the mixture to obtain hydrogen gas. This gas is then fed to an internal combustion engine capable of running on such gas. The engine generates exhaust products, consisting principally of water which is recycled back for mixing with the hydrocarbon fuel and carbon dioxide which is not considered a pollutant.

20 Claims, 2 Drawing Figures

INVENTOR
MARC S. NEWKIRK
BY
Cesari and McKenna
ATTORNEYS

METHOD AND MEANS FOR GENERATING HYDROGEN AND A MOTIVE SOURCE INCORPORATING SAME

BACKGROUND OF THE INVENTION

This invention relates to a system for generating hydrogen gas. It relates more particularly to a system of this type which is compact and efficient enough to be an on-board fuel source for a hydrogen fueled internal combustion system.

Hydrogen fueled engines are, of course, not new. People have sought to develop engines such as this because of the very low amount of pollutants which the engines emit. That is, the primary exhaust product of hydrogen combustion is water vapor which does not contaminate the atmosphere.

The utilization of a hydrogen fueled engine to power an automobile or other vehicle requires that a source of hydrogen be maintained on the vehicle itself. Conventionally, this has been done by storing a quantity of hydrogen gas under pressure in a tank carried by the vehicle. Obviously, that fuel source has its limitations since the supply of gas is exhausted relatively quickly. It has also been proposed to store a quantity of hydrogen in liquid form. However, this requires the utilization of a cryogenic tank or the like which is relatively bulky and quite expensive to make. Also, the amount of hydrogen that can be stored in this fashion is still relatively limited. It has also been suggested to generate the hydrogen right on the vehicle either by electrolysis or by chemical means. However, attempts such as this have not met with much success principally because of the expense, but also because the amount of hydrogen that can be generated as a function of time for a sustained period is relatively small.

SUMMARY OF THE INVENTION

Accordingly, it is an object of the present invention to provide a system for generating hydrogen gas which is compact and efficient enough to be carried on board a hydrogen fueled vehicle.

Another object of the invention is to provide a system for generating hydrogen gas used to power an associated motive source.

Yet another object of the invention is to provide a system for generating hydrogen gas from a relatively inexpensive hydrocarbon fuel.

Another object is to provide a system for generating hydrogen gas for an internal combustion engine which uses the engine's exhaust products in the hydrogen generation process.

A further object of the invention is to provide a hydrogen fueled engine having a self-contained hydrogen source.

Another object of the invention is to provide a system for generating hydrogen which is relatively reliable and safe.

Other objects will in part be obvious and will in part appear hereinafter.

The invention accordingly comprises the others and the apparatus embodying the features of construction, combination of elements and arrangement of parts all as exemplified in the following detailed disclosure, and the scope of the invention will be indicated in the claims.

Briefly, the present system mixes a relatively inexpensive hydrocarbon fuel such as kerosene with water and heats the mixture in a thermal cracking unit sufficiently to decompose the hydrocarbon to generate hydrogen gas. The hydrocarbon fuel and water are pumped into the unit using special high pressure, low flow rate pumps to be described later which enable the unit to operate at relatively high pressure, on the order of 1,200–1,400 psi, for maximum efficiency. Also, a portion of the hydrogen gas generated by the unit is fed back to the unit and mixed with air and ignited to develop the necessary heat to decompose the hydrocarbon.

The major portion of the gas produced by the cracking unit is stored under high pressure in a tank so that a supply of fuel is always available for use by an associated engine. Consequently, the cracking unit does not have to operate continuously while the engine is running. Rather, it operates only when the gas pressure in the system falls below the determined amount, e.g. 1,200 psi.

The gaseous fuel is conducted as needed from the tank to an internal combustion engine which is capable of running on hydrogen gas. A suitable engine of this type is disclosed in copending application Ser. No. 47,990, filed June 22, 1970, entitled Gas Fueled Internal Combustion Engine. The engine exhaust is comprised primarily of high energy steam, the major portion of which is condensed and pumped to a tank to provide a supply of water for mixing with the kerosene fuel. This further increases the overall efficiency and performance of the system.

Provision is also made for preventing excessive build-up of pressure in the system and for automatically shutting the cracking unit off in the event of a malfunction. All of these factors make the present system especially safe and reliable for use as a self-contained motive source for land, sea and air vehicles, for heating and generating plants and as a source of hydrogen gas for aerospace applications, fuel cells and the like.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
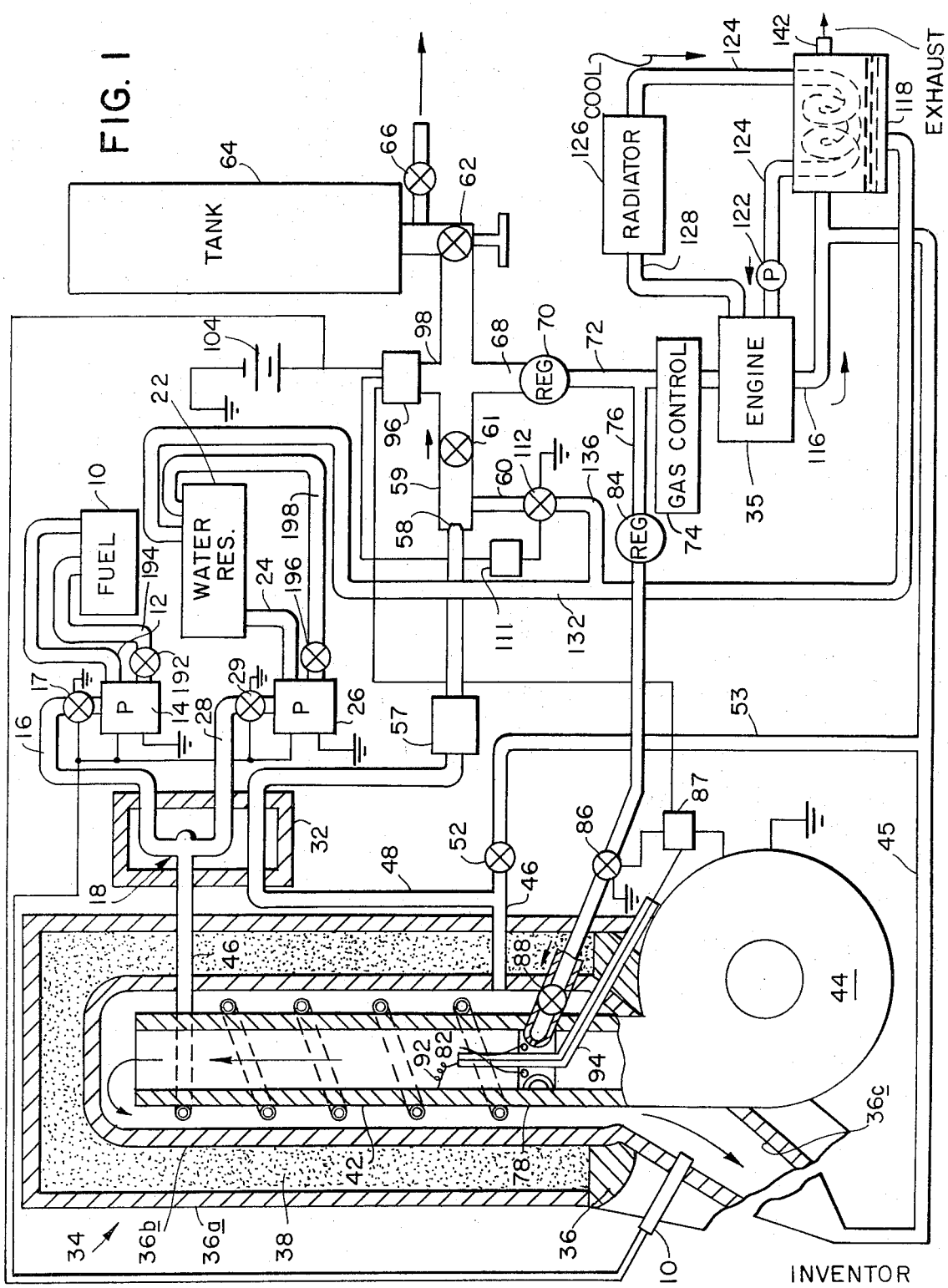
FIG. 1 is a diagrammatic view of a hydrogen generation system embodying the principles of our invention.

Turning now to FIG. 1 of the drawings, a relatively low-priced, easily available liquid fuel such as kerosene is stored in tank 10. A conduit 12 conducts the fuel from tank 10 to a special high pressure, low volume pump 14 to be described in more detail later. The fuel is then pumped through a conduit 16 including a solenoid-operated valve 17 to a mixing chamber 18 where it is thoroughly mixed with water. This water is supplied from a water reservoir 22 by way of a conduit 24 containing a pump 26 similar to pump 14. Pump 26 pumps the water at high pressure through conduit 28 containing a solenoid valve 29 to chamber 18 where it mixes with the fuel. Chamber 18 is located in a heat exchanger 32 so that the incoming fuel-water mixture is heated prior to entering a cracking unit shown generally at 34. Unit 34 generates sufficient hydrogen gas to supply the needs of an internal combustion engine 35 such as the one disclosed in the aforesaid pending application.

Cracking unit 34 comprises an insulated housing 36 having a generally rectangular outer wall 36a and a generally cylindrical inner wall 36b. The space between the two walls is filled with a suitable nonflammable insulating material 38. Situated inside housing 36 is an open-ended tube 42. The lower end of tube 42 connects to the outlet of a relatively powerful centrifugal blower 44 while the upper end of tube 42 is spaced from the end of the housing wall 36b. When blower 44 is operating, air is forced up through the tube 42 exiting through the upper end thereof and passing down through the space between tube 42 and the inside wall 36b of housing 36. The lower end of the housing 36 opens into an exhaust manifold 36c which may be connected by a conduit 45 to the engine 35 exhaust as will be described later.

The fuel-water mixture from chamber 18 is conducted via a conduit 46 into housing 36. The portion of conduit 46 inside the housing is wound in spiral fashion tightly around the tube 42, exiting the housing near the lower end thereof. As the fuel-water mixture travels through conduit 46 inside unit 34, it is heated to a temperature in excess of 1,500° F. which is sufficient to vaporize the fuel and water and to thermally decompose the hydrocarbon-water mixture to hydrogen gas, water vapor and carbon dioxide, although minor amounts of carbon monoxide and uncracked hydrocarbon may also be present.

These hot gases are then conducted via a conduit 48 connected to conduit 46 through the heat exchanger 32, where they give up some of their heat to the incoming fuel-water mixture and are cooled in the process. A relief valve 52 provided at the junction of conduits 46 and 48 prevents the buildup of excessive pressures in the cracking unit 34, e.g. 1,500 psi. Also, to avoid relieving these flammable gases directly to the atmosphere, they may be fed through a conduit 53 into conduit 45 and thence to the engine exhaust, being diluted with engine exhaust products well below combustible mixtures.

The cracked product from unit 34 is conducted from the heat exchanger 32 through a filter 57 and then expanded through an orifice 58 at the end of conduit 48 into a larger diameter conduit 59. Upon expansion through the orifice, the hot vapors and gases are cooled even more with the result that a large percentage of the steam content thereof is condensed to water. This water is removed by means of a steam trap 60 in conduit 59 just beyond restriction 58. Thus, the output of the generation system is primarily hydrogen and carbon dioxide gases. The latter gas is inert and does not interfere with the combustion of hydrogen in engine 35. In fact, it acts as an expansion medium during the combustion process so that engine efficiency is increased somewhat.

Conduit 59 conducts the gases by way of a check valve 61 and a shutoff valve 62 to a temporary gas storage tank 64. Valve 61 permits gases to flow toward tank 64, but not in the opposite direction. Valve 62 is included in the event that it is desired to isolate tank 64 when the system is being repaired. Also, tank 64 includes the usual pressure relief valve 66 for safety reasons. This valve is set to relieve at a higher pressure than valve 52, e.g., 3,300 psi, and gases issuing from valve 66 may be disposed of in the same way as those from valve 52, if desired. Since the gases are cooled as just mentioned, a maximum supply of fuel can be maintained in tank 64 at the desired pressure.

A conduit 68 connected to conduit 59 downstream from check valve 61 leads the hydrogen and carbon dioxide gases to a pressure regulator 70 that reduces the gas pressure to about 50 to 200 psi which is suitable for the engine. Another conduit 72 conducts the gases from the regulator 70 to engine 35 by way of a gas control system 74. System 74 controls the feeding of gas to the engine when the engine is turned on and the throttle is moved to its various positions of adjustment. Such a system is disclosed in the copending application noted above.

Conduit 72 also includes a branch line 76 ahead of the gas control system 74. Line 76 conducts a portion of the hydrogen gas back to the cracking unit 34 where it is mixed with air from blower 44 and ignited to supply the heat for the unit. More particularly, a toroidal manifold 78 is situated inside tube 42 near the bottom thereof. This manifold has a number of openings 82 spaced around its inside wall. The conduit 76 extends through the housing walls 36a and 36b and the tube 42 and communicates with the interior of manifold 78.

A pressure regulator 84 included in conduit 76 meters the proper amount of gas to the manifold to create with the air from blower 44 a highly combustible gas-air mixture. Also, a solenoid-operated valve 86 is included in conduit 76 downstream from the regulator 84. This valve is open only when the cracking unit 34 is in operation, as will be described in more detail later. Finally, a check valve 88 in conduit 76 just ahead of manifold 78 allows gas to flow into the manifold, but not in the opposite direction. This is to prevent the buildup of an explosive mixture inside the conduits.

The gas-air mixture inside tube 42 is ignited at the proper time by means of a hot filament wire 92 positioned just above manifold 78. One end of wire 92 is connected to tube 42 which constitutes an electrical ground, the other end of the wire is led out of the cracking unit through an insulating tube 94 which extends down through manifold 78 and out through openings in tube 42 and housing walls 36a and 36b. Hot wire 92 is connected in series electrically with a time-delay relay 87, a pressure switch 96 responsive to the pressure in a stub branch 98 of conduit 59 and a conventional current source, illustratively a battery 104. On the other hand, blower 44 is connected in parallel with valve 86 and hot wire 92. Switch 96 closes only when the pressure in conduit 59 (and tank 64) drops below the 1,200 psi normal operating pressure of the system. It remains closed until the pressure exceeds a selected value higher than 1,200 psi, e.g., 1,350 psi. Pressure switches having this operating "spread" are commercially available.

When switch 96 closes, hot wire 92 begins to heat and time-delay relay 87 begins to operate. After a short period of, for example, 5 seconds, time-delay relay 87 actuates solenoid valve 86, allowing gas to flow across hot wire 92 where it is ignited. At the same time, blower 44 is actuated by time-delay relay 87 and begins to blow air through tube 42. After the solenoid valve 86 opens and blower 44 begins to operate, time-delay relay 87 turns off the hot wire 92 in order to conserve battery strength. Time-delay relay 87 is connected in series with hot wire 92 in such a manner that should hot wire 92 fail, the time-delay circuit would open, preventing any flow of fuel through solenoid valve 86. The heat of combustion of the gas-air mixture in tube 42 is sufficient to heat tube 42 and the conduit wound around it to the preferred cracking temperature.

Since the combustion inside tube 42 is not normally entirely confined, it proceeds relatively efficiently so that the combustion products are, for the most part, water vapor, although there will be some carbon dioxide and a small amount of unburned hydrocarbons as well. Thus, even if these combustion products are released directly to the atmosphere, they cause a minimal amount of pollution.

The cracking unit 34 continues to generate hydrogen gas until the pressure in conduit 56 exceeds 1,350 psi. Whereupon, blower 44 stops and solenoid valve 86 closes, thereby shutting off unit 34.

Still referring to FIG. 1, steps are taken to insure that the cracking unit 34 is heated sufficiently to thermally decompose the hydrocarbon before the fuel-water mixture is allowed to enter the cracking unit. This is to prevent uncracked fuel from passing through the unit and on into the associated engine 35. More particularly, a heat-responsive switch 110 is installed in exhaust manifold 36c. Switch 110 is in a series-parallel circuit with battery 104 and pumps 14 and 26 so that it controls the operation of these pumps. Only when the cracking unit 34 is heated to a temperature sufficient to crack the incoming fuel-water mixture will switch 110 turn on pumps 14 and 26. Further, in the event that the flame inside tube 42 fails, the temperature of the unit will quickly drop, causing switch 110 to shut off pumps 14 and 26, thereby stopping the flow of liquid into the cracking unit.

When the generation system is used in a vehicle, as illustrated, tank 64 contains a supply of hydrogen gas so that the engine 35 can be started and run for a time on the gas already contained in tank 64. As soon as the pressure in the tank drops below 1,200 psi, however, the pressure switch 96 will close, thereby energizing hot wire 92 and time-delay relay 87 to ignite the combustible mixture formed inside tube 42. Then when the temperature of the cracking unit 34 heats to the desired temperature, i.e., in excess of 1,500° F., switch 110 closes, thereby allowing the fuel-water mixture to enter the cracking unit. The unit thermally decomposes the liquid to generate more gaseous fuel at high pressure which refills the tank 64 until the gas pressure therein exceeds the desired 1,350 psi value. At this point, switch 96 opens, thereby shutting off the cracking unit 34. The system remains off until the next time the gas pressure drops below 1,200 psi. Thus, the hydrogen generation system cycles on and off to meet the demands of the engine or other device consuming the hydrogen produced by the system.

The system is designed in such a manner that pressure will be maintained in the tank 64 of at least 1,200 psi regardless of engine operation. Naturally, an empty tank 64 would have to be charged initially with gas in order to heat unit 34 for the first time.

Pressure switch 96 is of a dual contact type. One set of contacts opens with rising pressure and closes with falling pressure. This set of contacts is connected to time-delay relay 87. A second set of contacts in switch 96 closes with rising pressure and opens with falling pressure. This set of contacts is connected in series with a time-delay relay 111 and a solenoid valve 112. When the gas pressure in conduit 98 exceeds the desired 1,350 psi, the first set of contacts in switch 96 opens, thereby shutting off the cracking unit 34 at the same time. The second set of points closes, energizing solenoid valve 112 and time-delay relay 111. Time-delay relay 111 is of a type that allows solenoid valve 112 to open only for a brief period, for example, one second, to allow water to be expelled under pressure from trap 60. After the desired brief period, the time-delay relay closes valve 112. When the pressure in conduit 98 again falls below the desired 1,200 psi pressure, the second set of contacts in switch 96 will open and time-delay relay 111 will return to the beginning of its cycle.

Inside engine 35, the hydrogen gas is mixed with air and consumed with the carbon dioxide and residual water vapor acting as an expansion medium. The principal exhaust products of the engine are therefore high energy steam and carbon dioxide.

An exhaust manifold 116 conducts the exhaust products from the engine 35 to a heat exchanger 118 where the high energy steam in the exhaust is cooled and condensed by the water in the engine's cooling system. More particularly, the engine's water pump 122 pumps cooling fluid through the engine and thence through hose 128 to the automobile radiator 126. Another conduit 124 carries the cooling fluid in a circuitous path through the heat exchanger 118 and thence back to water pump 122. The radiator 126 system has sufficient cooling capacity to cool both the engine and the exhaust gases in heat exchanger 118.

The water condensed in heat exchanger 118 is conducted back to water reservoir 22 by way of return line 132. Thus, a large part of the water content in the exhaust is recycled to crack additional hydrocarbon fuel. This minimizes the necessity of replenishing the water supply carried by the vehicle. Also, the water obtained from trap 60 in the manner described above may be conducted back to reservoir 22 by means of the conduit 136 extending from the outlet of valve 112 to conduit 132. In addition, as noted previously, the exhaust products from the cracking unit 34 may be conducted by conduit 45 to the engine 35 exhaust and the steam content thereof condensed in the heat exchanger 118 to provide even more water.

With the water in the engine exhaust being removed as aforesaid, the principal exhaust product issuing from heat exchanger 118 through the exhaust pipe 142 is carbon dioxide which is not considered a pollutant. There may also be a minor amount of unburned hydrocarbons and carbon monoxide which are pollutants, although the amounts involved are far less than would be the case with a conventional internal combustion engine burning a liquid hydrocarbon or a gas such as propane or natural gas. Moreover, the present system produces essentially no nitrogen oxides which are especially harmful contaminants.

By controlling the proportions of water and fuel entering the cracking unit 34, and the cracking temperature, one may control to some extent the output of that unit. More particularly, we have found that if there is an excess of water at a temperature of about 1,050° C., the unit 34 output consists almost entirely of hydrogen gas, carbon dioxide gas and steam. These products are not considered pollutants. Consequently, when the engine 35 is run on these compounds, the engine exhaust is substantially pollution-free, even if the engine is not tuned properly. On the other hand, if less water is used and the input liquid heated to 700° C., the output of the cracking unit consists primarily of hydrogen gas and carbon monoxide. Finally, if no water at all is mixed with the incoming fuel and the unit is maintained at a temperature of approximately 1,000° C., then the thermal decomposition products are primarily hydrogen gas and carbon. Obviously, for engine applications, the cracking unit 34 should ideally be controlled so that the decomposition products are, for the most part, the non-pollutant compounds of hydrogen, carbon dioxide and water.

The efficiency of the thermal decomposition process can be improved even more by employing a catalyst in the cracking unit, a suitable catalyst being alumina grains with tungsten or molybdenum oxide surface coatings. Also, particularly in the case where a catalyst is used, the exhaust products issuing from exhaust pipe 142 which are still rather hot can be routed back to the cracking unit 34 to help heat the incoming fuel-water mixture before being expelled to the atmosphere.

Other modifications of the present system suggest themselves to improve its operation in particular applications. For example, the presence of carbon dioxide in the output of the cracking unit 34 may be undesirable in certain instances. In this event, that gas may be separated from the hydrogen gas by means of a centrifugal separator or other similar device which is capable of separating these gases.

It is believed that the steam reformation of a hydrocarbon fuel such as heptane ($C_7H_{16}$) proceeds in accordance with the following equation:

$$C_7H_{16} + 14H_2O \rightarrow 7CO_2 + 22H_2 \qquad 1$$

This breaks down into the following equations:

$$C_7H_{16} + 11O_2 \rightarrow 7CO_2 + 8H_2O \qquad 2$$

$$22H_2O \rightarrow 22H_2 + 11O_2 \qquad 3$$

Equation 2 is the combustion of heptane and Equation 3 is the combustion of hydrogen, in reverse. Adding these two together yields the basic Equation 1.

Equation 2 yields 1,150 kilocalories per gram mol of heptane. Equation 3 requires 1,515 kilocalories for 22 gram mols of hydrogen. Therefore, to carry out Equation 1 requires a net heat input of 365 kilocalories. However, the decomposition of heptane yields 22 gram mols of hydrogen which can be burned to yield 1,515 kilocalories. In practice, there are, of course, energy losses. However, these are believed to be on the order of 40 percent, so that the cracking unit 34 is still efficient enough to generate sufficient hydrogen gas to both heat itself and service an associated engine, fuel cell, or the like.

The decomposition of other hydrocarbon fuels including kerosene yields similar results.

Figure 2:
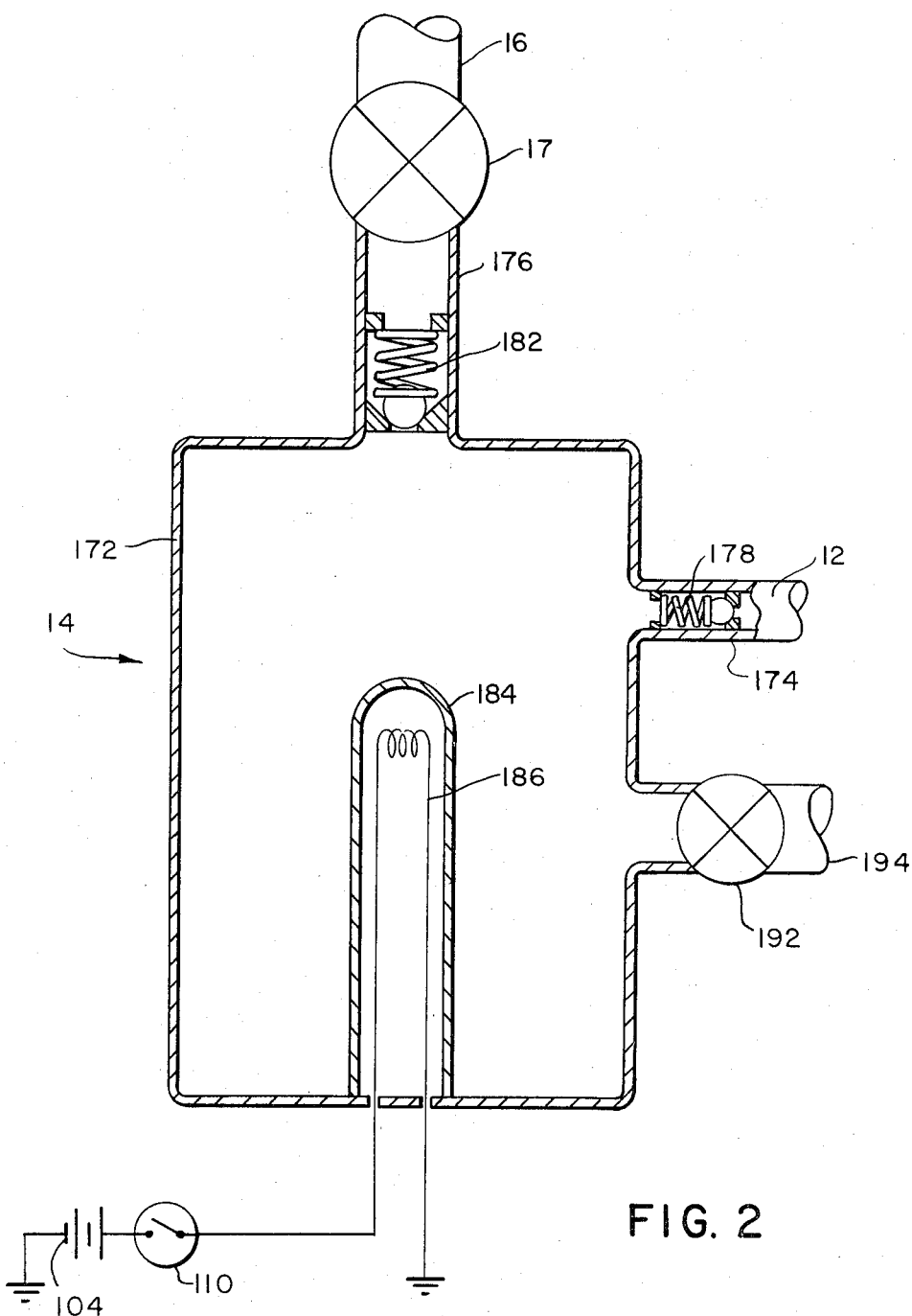
FIG. 2 is a view in medial section of a high pressure, low flow rate pump used in our system.

Turning now to FIG. 2, since the thermal decomposition process occurs at high pressure, on the order of 1,200–1,350 psi, special high pressure, low flow rate electric pumps 14 and 26 are used to pump the liquids into the cracking unit 34. These pumps have no moving parts (except check valves) and are quite simple. Since the two pumps are identical, we will describe only pump 14 in detail.

Pump 14 comprises a strong, rigid housing 172 which is made of high tensile strength steel or equivalent material. Housing 172 has an inlet 174 in its side wall which is connected to conduit 12 and an outlet 176 in its top wall which is connected to conduit 16. Conventional ball check valves 178 and 182 are situated in inlet 174 and outlet 176, respectively. Valve 178 allows fluid to flow into housing 172 but not in the opposite direction, while valve 182 allows fluid to flow only out of the housing.

An upstanding tube 184 which is closed at its upper end is welded to the bottom wall inside housing 172. This tube contains a Nichrome heating element 186 whose leads extend through insulated openings in the bottom wall of the housing. The element 186 is connected electrically with the battery 104 and heat-responsive switch 110.

Assuming that housing 172 is filled with liquid (fuel or water), when the heating element 186 is energized, it heats up the contents of the housing, causing a slight expansion of the liquid. Thus, some of the liquid is forced out through the outlet 176. On the other hand, when the heating element 186 is deenergized, the liquid in the housing cools and contracts to some extent, thereby developing a vacuum in the housing and drawing additional liquid into the housing through its inlet 174.

Thus, each time the heating element 186 is turned on, additional liquid is pumped out through the valve outlet 176 and each time the element is deenergized, more liquid is drawn through the inlet 174. Consequently, the pump 14 may be cycled on and off continuously, so as to pump liquid toward the cracking unit 34 (FIG. 1). Actually, a pump 14 operating over a temperature gradient of only 10°–30° F. is able to develop very high pressures, on the order of 50,000 psi. Further, the flow rate of the pump can be controlled somewhat by regulating the rate at which the heater 186 is cycled on and off by switch 110. Pumps 14 and 26 are so designed that the temperature rise created by heater 186 will generate sufficient pressure in pump 14 to cause precisely the amount of fluid to flow which is needed to take the tank 64 through one cycle from 1,200 psi to 1,350 psi. Accordingly, when the pressure rises to the desired point and switch 96 deactivates relay 87, causing unit 34 to cool, switch 110 opens, shutting off heater 186, and liquid is drawn in through inlet 174. Of course, a timing switch or similar device could be used in lieu of switch 110. Consequently, the pump has many other applications besides the one disclosed herein. For example, it can be used to pump fluid in a hydraulic lift. It can also be used in the motive force in crystal pulling apparatus in view of its very small, controllable incremental flow rate, or indeed in any other application which demands high pumping pressures and/or low flow rates.

The rise in ambient temperature could, of course, cause an increase in pressure within pump 14. In order to control this pressure and prevent undesired leakage into the system, the solenoid valve 17 is provided in conduit 16. This valve 17 is connected in parallel with heater 186 so that fuel flows out of the pump only when the pumps are operating. Further, in order to prevent undue pressure buildup in the system, a pressure relief valve 192 is provided in the pump housing 172 which opens at an appropriate pressure, e.g. 1,400 psi and allows liquid to be returned to storage tank 10 by way of a conduit 194.

The pump 26 operates in the same way with its solenoid outlet valve 29 operating in unison with valve 17. Also, it has a pressure relief valve 196 in a return line 198 leading back to reservoir 22 which operates like valve 192 associated with pump 14.

It is apparent from the foregoing then that the present system which thermally decomposes hydrocarbon fuels using a steam reformation process is a particularly compact, reliable and efficient source of hydrogen gas. Further, when combined with an engine capable of running on such gas, an especially desirable motive source is produced which has many varied applications in the automotive, marine and aerospace industries.

It will thus be seen that the objects set forth above, among those made apparent from the preceding description, are efficiently attained and, since certain changes may be made in the construction set forth without departing from the scope of the invention, it is intended that all matter contained in the above description, or shown in the accompanying drawings, be interpreted as illustrative and not in a limiting sense.

It is also to be understood that the following claims are intended to cover all of the generic and specific features of the invention herein described.

I claim:
1. A hydrogen powered motive source comprising
   A. a source of hydrocarbon fuel,
   B. a source of water,
   C. an internal combustion engine,
   D. a conduit connecting the fuel and water sources and the engine, and
   E. means for heating the conduit to a temperature sufficient to thermally decompose the fuel-water mixture to hydrogen which is then conducted to the engine and consumed in the internal combustion process.
2. The motive source defined in claim 1 and further including
   A. means for conducting a portion of the hydrogen gas being fed to the engine back to the conduit heating means, and
   B. means in the heating means for igniting the hydrogen gas conducted thereto in the presence of oxygen.
3. The motive source defined in claim 1 and further including
   A. means for condensing steam in the engine exhaust, and
   B. means for conducting condensate back to the water source.
4. The motive source defined in claim 1 and further including means for mixing the hydrocarbon fuel and water together prior to their being thermally decomposed.
5. The motive source defined in claim 4 and further including a heat exchanger for preheating the hydrocarbon fuel and water prior to their decomposition.
6. The motive source defined in claim 5 wherein the thermal decomposition products are conducted through the heat exchanger to preheat the incoming fuel and water.
7. The motive source defined in claim 1 wherein the fuel and water sources include high pressure, low volumetric flow rate pumps which maintain the fluids in the conduit under relatively high pressure during the decomposition process.
8. The motive source defined in claim 7 and further including a tank communicating with the conduit ahead of the engine for temporarily storing hydrogen gas generated during the thermal decomposition process so that such gas will be available immediately to meet the demands of the engine.
9. The motive source defined in claim 8 wherein the conduit includes a pressure regulator between the tank and the engine which reduces the gas pressure prior to the gas being fed to the engine.
10. The motive source defined in claim 8 and further including
   A. means in the conduit for condensing steam generated during the thermal decomposition process prior to its reaching the tank and the engine, and
   B. means for removing the condensate from the conduit.
11. The motive source defined in claim 10 wherein the condensing means includes an expansion chamber and the removing means comprises
   A. a trap, and
   B. means for conducting the condensate from the trap to the water source at predetermined times.
12. The motive source defined in claim 1 and further including means for controlling the operation of the heating means so as to maintain the pressure of the gas in the conduit above a selected minimum value.
13. The motive source defined in claim 3 wherein
   A. the engine includes a cooling system, and
   B. the condensing means is coupled to the cooling system and cooled thereby.
14. The motive source defined in claim 7 wherein each pump comprises
   A. a fluidtight housing,
   B. an inlet containing a check valve,
   C. an outlet containing a check valve, and
   D. means for heating the contents of the housing at selected time intervals.
15. The motive source defined in claim 1 and further including means for preventing flow of fuel and water through the conduit unless the heating means is heated to a selected temperature sufficient to thermally decompose the fuel and water mixture.
16. The motive source defined in claim 1 wherein
   A. the heating means comprises
      1 a heat exchange element,
      2 means for flowing air by the heat exchange element,
      3 means for flowing a gas by the element so as to create with the air a combustible mixture,

4 means for igniting the mixture at selected time intervals to heat the element, and B. the conduit is arranged in intimate heat exchange relation with the element so that when the air-gas mixture is ignited, sufficient heat is generated to thermally decompose the fuel and water contained in the conduit.

17. The motive source defined in claim 16 wherein a portion of the hydrogen gas generated in the conduit during the thermal decomposition process is tapped off to supply gas to heat the element.

18. The motive source defined in claim 16 and further including means for controlling the operation of the air flowing means, the gas flowing means and the igniting means so as to heat the element and conduit when the gas pressure in the conduit falls below a predetermined value.

19. The motive source defined in claim 1 and further including a catalyst inside the conduit and exposed to the fuel and water mixture therein.

20. The motive source defined in claim 19 wherein the catalyst is comprised of alumina grains having a surface coating selected of the group consisting of tungsten and molybdenum oxide.

* * * * *